(12) United States Patent
Nam et al.

(10) Patent No.: US 7,239,759 B2
(45) Date of Patent: Jul. 3, 2007

(54) SPATIAL IMAGE INFORMATION SYSTEM AND METHOD FOR SUPPORTING EFFICIENT STORAGE AND RETRIEVAL OF SPATIAL IMAGES

(75) Inventors: Kwang Woo Nam, Chungcheongbuk-Do (KR); Jong Hun Lee, Seoul (KR); Jae Jun Yoo, Seoul (KR); In Hak Joo, Taejon (KR); Min Soo Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 936 days.

(21) Appl. No.: 10/611,999

(22) Filed: Jul. 3, 2003

(65) Prior Publication Data

US 2004/0073578 A1 Apr. 15, 2004

(30) Foreign Application Priority Data

Oct. 14, 2002 (KR) ...................... 10-2002-0062417

(51) Int. Cl.
*G06K 9/54* (2006.01)
*G06K 9/60* (2006.01)
*G06K 9/32* (2006.01)
*G06K 9/00* (2006.01)

(52) U.S. Cl. ...................... 382/305; 382/294
(58) Field of Classification Search ............... 382/305, 382/294, 295, 296, 307, 100, 254, 260–264, 382/284; 701/200, 208; 702/5; 348/113, 348/117, 143, 144, 147; 707/3, 100, 102
See application file for complete search history.

(56) References Cited

U.S. PATENT DOCUMENTS

| | | | |
|---|---|---|---|
| 5,596,494 A * | 1/1997 | Kuo | 702/2 |
| 5,633,946 A | 5/1997 | Lachinski et al. | |
| 6,216,130 B1 | 4/2001 | Hougaard et al. | |
| 6,512,857 B1 * | 1/2003 | Hsu et al. | 382/294 |
| 6,597,818 B2 * | 7/2003 | Kumar et al. | 382/294 |
| 2003/0225513 A1 * | 12/2003 | Gagvani et al. | 701/211 |

* cited by examiner

*Primary Examiner*—Yon J. Couso
(74) *Attorney, Agent, or Firm*—Lowe Hauptman & Berber LLP

(57) ABSTRACT

Disclosed is a spatial image information method and system for rapid and efficient storage in a relation type database and retrieval and management of spatial images acquired by a combined system of a global positioning system (GPS), an inertial navigation system (INS), and an image acquisition device (i.e., CCD camera). The spatial image acquired by the GPS/INS/CCD camera combined system is combined with an exterior orientation composed of a camera position (x,y,z), accelerated velocity, slope and direction at the moment the image is acquired and an interior orientation acquired by a camera calibration, so that calculation of a specified spatial coordinate information becomes possible. The spatial image information system includes a section for efficiently storing a chain of still spatial image sequences acquired by the GPS/INS/CCD camera combined system, the exterior orientation, and the interior orientation in the relation type database, a section for storing spatial information recognized as the same object by a user as maintaining the relationship with the stored still spatial image sequences, a section for efficiently retrieving images that satisfy a certain spatial information operation from the still spatial image sequences, and an interface section for external systems.

15 Claims, 7 Drawing Sheets

FIG.2
(a)
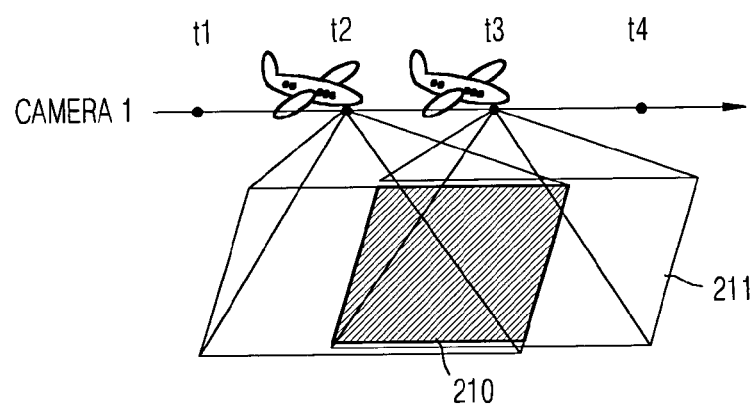
(b)
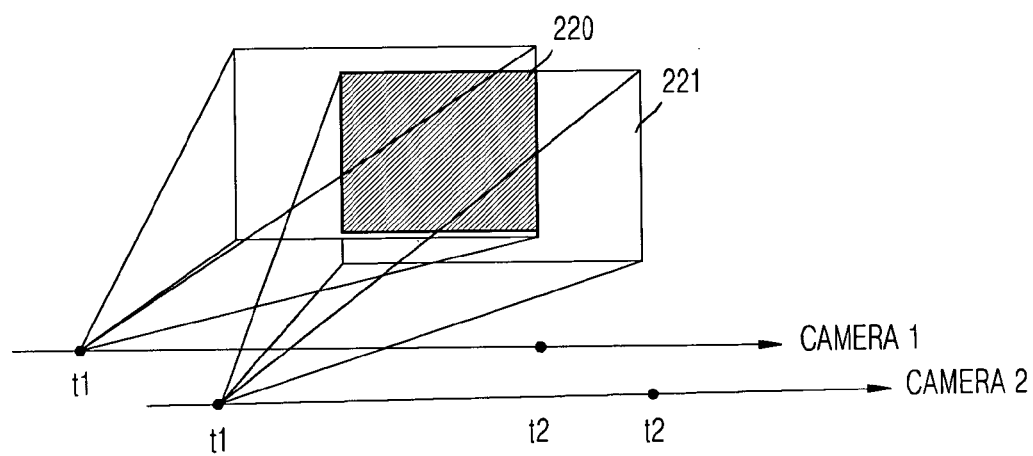
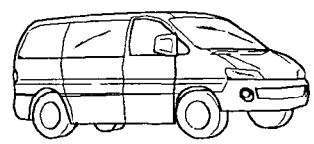

FIG. 4

(a) GeoImageSequenceInfo

| GeoImageSequenceID | CreationTime | CreationType | NumOfCamera | InteriorOrientation | MBR | DataSource |
|---|---|---|---|---|---|---|

(b) GeoImageSequenceIndexes

| GeoImageSequenceID | CameraNumber | fromTime | toTime | MBR | SequenceIndexType | SequenceIndex |
|---|---|---|---|---|---|---|

| CameraPath | CameraTimeIndex | ViewAreaType | ViewAreaIndex |
|---|---|---|---|

(c) GeoImageSequence<GeoImageSquenceID>

| GeoImageID | CameraNumber | ViewArea | CreationTime | X | Y | Z | roll | pitch | refGeoImage | MBR | rowData |
|---|---|---|---|---|---|---|---|---|---|---|---|

(d) GeoImage<GeoImageSquenceID>

| GeoObjectID | GeoImageID | ObjectType | MBR | ObjectShape |
|---|---|---|---|---|

(e) GeoObjectID<ObjectTypeName>

| GeoObjectID | ObjectType | ObjectName | ObjectAttribute$_1$ | ... | ObjectAttribute$_n$ |
|---|---|---|---|---|---|

FIG.6
(a)
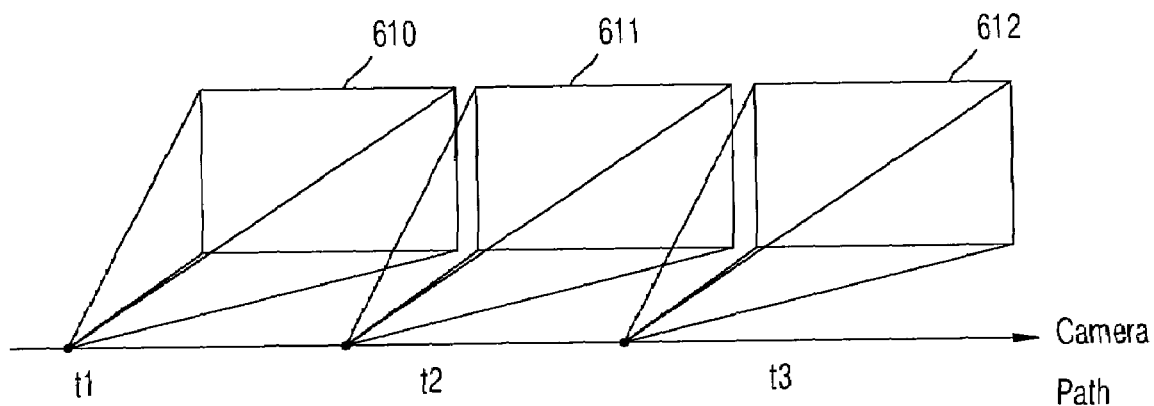
(b)
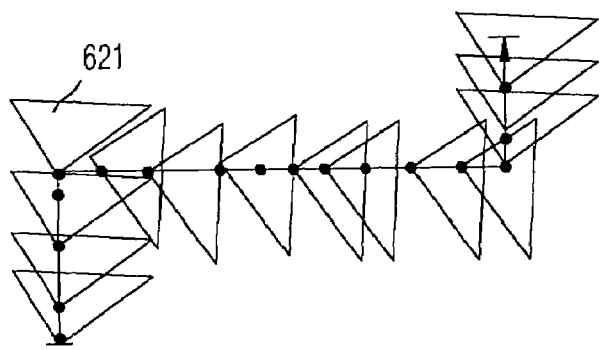
(c)
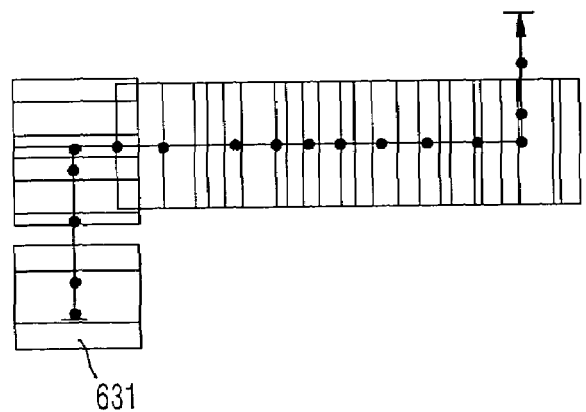

SPATIAL IMAGE INFORMATION SYSTEM AND METHOD FOR SUPPORTING EFFICIENT STORAGE AND RETRIEVAL OF SPATIAL IMAGES

BACKGROUND OF THE INVENTION

1. Field of the Invention

The present invention relates to a method and system for efficient storage and retrieval of a chain of spatial images, and more particularly, to a spatial image information method and system capable of efficiently retrieving spatial images by storing in a database the spatial images acquired through an image acquisition device, in which a global positioning system (GPS) and an inertial navigation system (INS) are combined, along with an interior orientation and exterior orientation, and maintaining meta information and indexes of the stored spatial images.

2. Background of the Related Art

Recently, as diverse services using a geographic information system (GIS) have widely been highlighted, there is an increasing interest in a spatial image information system for more efficient storage and retrieval of acquired spatial images. In order to construct the geographic information system is used a navigation system for acquiring spatial position information. The inertial navigation system (INS) and the global positioning system (GPS) are the widely used navigation systems.

The INS is a system for finding navigation information of an object using an accelerometer and a gyro, and is used in a flying object or a ship. This INS is not affected by an external environment, and has the advantage in that it provides very accurate and sequential navigation data for a short period of voyage, while it has the disadvantage in that errors are accumulated for a long period of voyage.

Meanwhile, the global positioning system (GPS) is a system for acquiring the position, speed, etc., of an object by measuring the distance between the object and at least four satellites among 24 orbiting satellites going round the earth. This GPS has the advantage in that errors are not accumulated with the lapse of time and it is inexpensive, but has the disadvantage in that its performance deteriorates if at least four orbiting satellites are not secured. Accordingly, researches for combining the two systems are actively in progress since the two systems are complementary.

The term 'spatial image' means an aerial image or a satellite image acquired by an airplane or a satellite that mounts the GPS or INS, or an image acquired by an image acquisition device such as a CCD camera of a moving vehicle such as a GPS van that mounts a GPS/INS combined system. Such a spatial image has the advantage in that it is possible to measure spatial information within the image by way of an exterior orientation composed of a camera position (x,y,z), accelerated velocity, slope and direction at the moment the image is acquired, and an interior orientation acquired by a camera calibration. Since this spatial image is of a large capacity, a spatial image information system for the efficient storage and management thereof is required.

However, the conventional spatial image information systems have the problems in that they use a method of simply storing related data in a file system in the unit of a file or a directory, or simply use only an interface of a database system as they cannot support an effective retrieving method for the spatial images even though they use the database, thereby deteriorating the their performance.

SUMMARY OF THE INVENTION

Accordingly, the present invention is directed to a spatial image information method and system for supporting efficient storage and retrieval of spatial images, which substantially obviates one or more problems due to limitations and disadvantages of the related art.

It is an object of the present invention to provide to a spatial image information method and system capable of rapidly retrieving spatial images by efficiently storing different kinds of spatial image sequences in a database, and maintaining meta index information of the stored spatial images.

It is another object of the present invention to provide a spatial image information system which improves the availability of the system and enables easy implementation of applications by processing a retrieval query about spatial images according to a request from a client and having a real coordinate conversion function with respect to the spatial images.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In order to achieve the above objects, there is provided a spatial image information system for efficient storage and retrieval of spatial images acquired by an image acquisition device provided with a navigation system, comprising a spatial image query interface component section for performing an interface function for interfacing with an external client, and processing a spatial image database construction query, spatial image retrieval/insertion/deletion queries, and a spatial object information manipulation query in the spatial images; a spatial image meta information component section for managing schema and index information of spatial image sequences, and processing a query about index information if the query about the index information is inputted from the spatial image query interface component section; a spatial image storage/retrieval component section for processing storage, retrieval and management of the spatial image sequences according to the query of the spatial image query interface component section; a spatial image to real coordinate conversion component section for receiving and converting the spatial image and a specified position in the image into a real-world coordinate (x,y,z) or receiving and converting the real-world coordinate (x,y,z) and the spatial image into the specified position in the spatial image according to the query of the spatial image query interface component section; and an open type spatial image database interface component section for storing and managing the spatial images by interfacing the spatial image meta information component section, the spatial image storage/retrieval component section and the spatial image to real coordinate conversion component section with a storage system irrespective of a kind of the storage system.

In another aspect of the present invention, there is provided a method for retrieving spatial images including a designated area in a spatial image information system for storing the spatial images acquired by an image acquisition device provided with a navigation system using a database structure composed of spatial image sequence tables for storing the spatial images and information, spatial image object tables for storing information on spatial objects existing in spatial image sequences, a spatial image sequence information table including schema information and indexes of the spatial image sequences and summary information, and a spatial image sequence index table for managing indexes so as to promptly retrieve the spatial image sequence tables, comprising a spatial image sequence filtering step of retrieving the spatial image sequences including the designated area using the spatial image sequence indexes of the spatial image sequence index table; a spatial image filtering step of retrieving the spatial images including the designated area with respect to the spatial image sequences retrieved at the spatial image sequence filtering step; and a spatial image refining step of checking whether a real spatial image includes the designated area by loading the spatial images, which are retrieved at the spatial image filtering step, from the spatial image sequence tables.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 2A and 2B are views explaining a spatial image acquisition method according to the present invention.

FIGS. 4A to 4E are views illustrating a detailed schema of tables constituting the spatial image information system according to the present invention.

FIGS. 6A to 6C are views illustrating a method of constructing indexes of spatial images according to the present invention.

DETAILED DESCRIPTION OF THE PREFERRED EMBODIMENT

A spatial image information method and system for efficient storage and retrieval of spatial images according to the preferred embodiment of the present invention will now be explained in detail with reference to the accompanying drawings.

Figure 1:
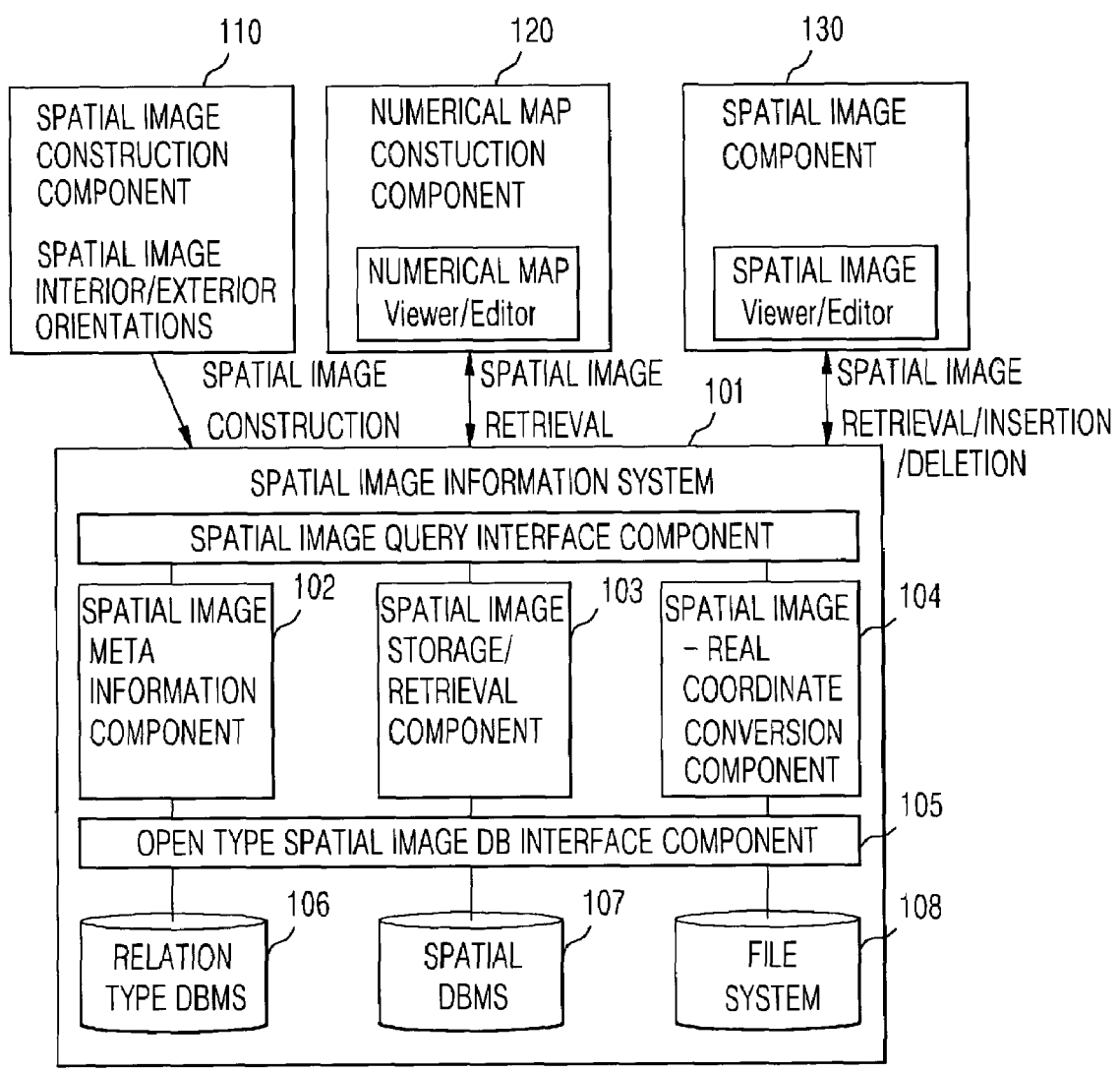
FIG. 1 is a block diagram illustrating the construction of a spatial image information system according to the present invention.

FIG. 1 is a block diagram illustrating the construction of a spatial image information system according to the present invention.

Referring to FIG. 1, the spatial image information system 100 according to the embodiment of the present invention includes a spatial image query interface component section 101 for performing an interface function with an external client, and processing a spatial image database (DB) construction query, spatial image retrieval/insertion/deletion queries, a spatial object information manipulation query in the spatial images, etc., a spatial image meta information component section 102 for managing schema and index information of spatial image sequences, a spatial image storage/retrieval component section 103 for processing storage, retrieval and management of the spatial image sequences, a spatial image to real coordinate conversion component section 104 for receiving and converting the spatial image and a specified position in the image into a real-world coordinate (x,y,z) or receiving and converting the real-world coordinate (x,y,z) and the spatial image into the specified position in the spatial image, and an open type spatial image database interface component section 105 for storing and managing the spatial images irrespective of the kind of a storage system such as a relation type DBMS 106, a spatial DBMS 107, a file system 108, etc.

Also, The spatial image information system 100 according to the present invention processes external queries such as a chain of spatial image sequence construction queries inputted from an external spatial image DB construction component section 110 and spatial image manipulation queries including spatial image retrieval/insertion/deletion from a numerical map construction component section 120 or a spatial image component section 130 in order to construct a database (DB) of images acquired by an image acquisition device such as a CCD camera combined with a GPS/INS combined system through the spatial image query interface component section 101 and spatial images composed of interior/exterior orientations.

FIGS. 2A and 2B are views explaining a spatial image acquisition method according to the present invention.

The spatial image information system 100 according to the embodiment of the present invention, as described above, processes the spatial images acquired by the image acquisition device associated with the GPS/INS combined system. These spatial images can be acquired by a single camera system or a stereo camera system.

Typically, as shown in FIG. 2A, the single camera system is mainly used for aerial images and satellite images, and extracts spatial information of an object in an overlap spatial area 210 by acquiring images for the same space 210 from different positions by photographic surveying using one camera. That is, as shown in FIG. 2A, the single camera mounted in an airplane acquires spatial images by photographing at predetermined intervals (t1, t2, t3, t4, . . . ) as it moves with the airplane. For example, the single camera extracts the spatial information of the object in the overlap spatial area 210 by photographing a first spatial image 211 at a time t2, photographing a second spatial image 212 at a time t3, and then performing photographic surveying. Meanwhile, a stereo camera system is mainly used for ground spatial image acquisition, and as shown in FIG. 2B, extracts spatial information of an image 220 in the same space where a first extracted spatial image 221 and a second extracted spatial image 222, which were photographed at the same time t1 by first and second cameras mounted in a van provided with the GPS/INS system, overlap with each other.

The spatial image information system 100 according to the present invention supports the structure that can process both the spatial images by the single camera system and the spatial images by the stereo camera system. That is, as shown in FIGS. 2A and 2B, the collection of the spatial images acquired through a chain of sequential spatial image acquisition actions at limited intervals (t1, t2, . . . , tn) for the single purpose is defined as a spatial image sequence (geolmage Sequence), which is used as a basic processing unit of the spatial image information system 100 according to the present invention.

Figure 3:
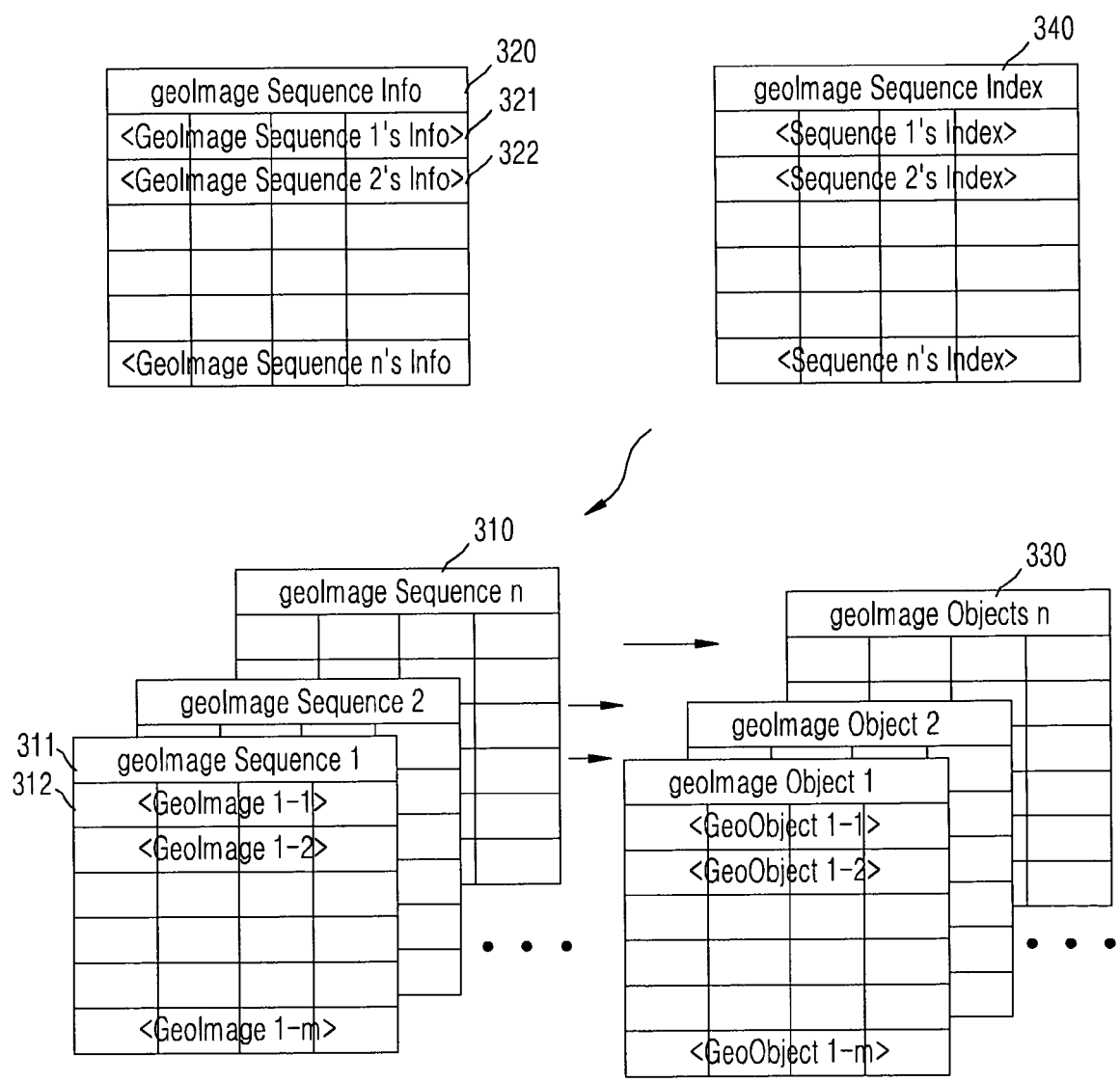
FIG. 3 is a view illustrating a database structure for storing spatial images according to the present invention.

FIG. 3 is a view illustrating a spatial image information database structure for storing spatial image information in the spatial image information system according to the present invention. As described above, the spatial image information database according to the present invention is basically composed of a set of spatial image sequences (GeoImage Sequences) 310 that is a collection of spatial images and information, a set of spatial image object tables (GeoImage Objects) 330 for storing information on spatial objects existing in the respective image sequences, a spatial image sequence information table (GeoImage Sequence-Info) 320 including schema information and indexes of the respective spatial image sequences and summary information, and a spatial image sequence index table (GeoImage Sequence Index) 340 that is an index table for enabling a rapid retrieval of the spatial image sequence table. In addition, spatial image videos and spatial image photographs may be associated with the spatial image information database.

In more detail, the spatial image information database of FIG. 3 includes first to n-th spatial image sequences (geoImage Sequences 1 to n), and the spatial image sequence information (geoImage SequenceInfo) table 320 is composed of n rows so as to include information of the first to n-th spatial image sequences in the database. That is, in the spatial image sequence information table 320, the reference numeral '321' stores information of the first spatial image sequence (geoImage Sequence 1), and '322' stores information of the second spatial image sequence (geoImage Sequence 2).

FIGS. 4A to 4E are views illustrating the detailed schema of tables constituting the spatial image information database explained with reference to FIG. 3.

FIG. 4A shows the schema of the spatial image sequence information (GeoImageSequenceInfo) table. The spatial image sequence information table 320 maintains information on the spatial image sequences in the spatial image information system 100. That is, as shown in FIG. 4A, the spatial image sequence information table 320 is composed of a spatial image sequence identifier (GeoImageSequenceID) column that is an identifier of the respective spatial image sequence, an acquisition time, i.e., a creation time (CreationDate) column for storing the time when the spatial image is acquired, a camera type (CameraType) column for indicating whether the system for the spatial image acquisition is a general camera for acquiring a snapshot image or a video type sequential spatial image acquisition camera, a column of the number of cameras (NumOfCameras) for indicating the number of cameras used for the image acquisition in order to discriminate whether the image acquisition system is composed of a single camera or at least two cameras as shown in FIGS. 2A and 2B, a column of the number of spatial images (NumOfGeoImages) that is the base of the spatial image acquisition, an interior orientation (InteriorOrientation) column for storing an interior orientation of a camera lens, a minimum bounding rectangle (MBR) column for the MBR for a view area of the spatial image sequence, and a data source (DataSource) column for indicating a storage position of the real acquired spatial image, and storing a name of a directory where a still spatial image is stored or a name of d spatial image video.

In the spatial image sequence information table 320 of FIG. 4A, the camera type (CameraType) column and the column of the number of cameras (NumOfCameras) are newly proposed so that the spatial image information system 100 according to the present invention processes the video spatial image and the still spatial image data in a combined manner, and is distinguished from the existing spatial image information systems.

Here, if the value of the camera type (CameraType) column is "video", the value of the data source (DataSource) column becomes the position of the acquired spatial image video, and since the value of a reference spatial image (refGeoImage) column of the spatial image sequence (GeoImageSequence) table 310, which will be explained later, becomes a relative time of the spatial image video, the spatial image will be referred to.

In case of the still spatial image, the value of the camera type (CameraType) column is set to a "snapshot", and at this time, the value of the data source (DataSource) column becomes an "in-row (InRow)" or a "directory name of a file system where the still spatial image exists". In case that the value of the data source (DataSource) column is the "in-row (InRow)", the value of the reference spatial image (refGeoImage) column of the spatial image sequence (GeoImageSequence) table 310 becomes "Null", and the real data is stored in a row data (rowData) column of the same table. In case of storing the real data in the file system, the value of the reference spatial image (refGeoImage) column becomes the name of the still spatial image existing in the directory, and the value of the row data (rowData) column becomes "Null".

In FIG. 4A, the column of the number of cameras (NumOfCameras) is a column for managing the spatial image sequences in a combined manner irrespective of the number of cameras for acquiring the spatial images. Indexes of the spatial image sequences are created in the spatial image sequence index (GeoImageSequenceIndex) table 340 as many as the value set in this column, and the value of the camera number (CameraNumber) column of the spatial image sequence index (GeoImageSequenceIndes) table 340 is set for discrimination.

The spatial image sequence index table 340 of FIG. 4B is proposed to improve the retrieval performance of the spatial image information system 100 according to the present invention. The spatial image sequence index table 340 is composed of a spatial image sequence identifier (GeoImageSequenceID) column for an identifier of a spatial image sequence subject to indexing, an acquisition start time (fromTime) column for storing the smallest image acquisition time value in the spatial image sequence, an acquisition end time (toTime) column for storing the largest image acquisition time value, an MBR column for the minimum bounding rectangle (MBR) of the moving trace of the camera, a camera path (CameraPath) column for heightening a query speed with respect to the moving trace path of the camera by storing the moving trace path of the camera in the form of a line string (LineString) in order to reduce a fault area which becomes too much if filtering is performed using the MBR during the spatial image retrieval by the moving path trace of the camera, a sequence index type (SequenceIndexType) column and sequence index (SequenceIndex) column for efficiently retrieving of what area the spatial image sequence in the spatial image information system includes spatial information, and a view area type (ViewAreaType) column and a view area index (ViewAreaIndex) column. Table 1 as below shows main columns of the index table of FIG. 4B.

TABLE 1

| Class | Column | Setup Value | Contents |
|---|---|---|---|
| Lifetime of Spatial Image Sequence | FromTime | | Time of spatial image having earliest acquisition time in a spatial image sequence |
| | Totime | | Time of spatial image having latest acquisition time in a spatial image sequence |
| Spatial Image Sequence Index | SequenceIndexType | MBR | Minimum bounding rectangle of an area included in a spatial image sequence |
| | | CONVEXHULL_TRIANGLE | Convex hull triangle including an effective spatial information area in a spatial image sequence |
| | | CONVEXHULL_MBR | Convex hull MBR including an effective spatial information area in a spatial image sequence |
| | | BUFFER | Buffer area including max effective spatial image |
| | SequenceIndex | | Corresponding value according to sequence index type |
| Spatial Image Index | MBR | | Minimum bounding rectangle of camera moving area in spatial image sequence |
| | CameraPath | | Camera Moving Path |
| | CameraTimeIndex | | List of time values at points p1, . . . , pm on camera moving path |
| Spatial Image View AreaIndex | ViewAreaType | MBR | Spatial information area in MBR spatial image |
| | | TRIANGLE | Spatial information area in triangle spatial image |
| | | 3DPYRAMID | Spatial information area in 3D pyramid spatial image |
| | ViewAreaIndex | | Index value of spatial information area included in spatial image |

Referring to Table 1, the acquisition start time (FromTime) column and the acquisition end time (ToTime) column correspond to a lifetime of the corresponding spatial image sequence. The acquisition start time (FromTime) represents the time of the spatial image having the earliest acquisition time in the spatial image sequence, and the acquisition end time (ToTime) represents the time of the spatial image having the latest acquisition time in the spatial image sequence.

The spatial image sequence index type (SequenceIndexType) column and the spatial image sequence index (SequenceIndex) column are for the index of the spatial image sequence as shown in FIGS. 5B to 5E. The spatial image sequence index type (SequenceIndexType) is an approximation method for the spatial information area included in the spatial image sequence. It may be set to one among "MBR", "CONVEXHULL_TRIANGLE", "CONVEXHULL_MBR", and "BUFFER", and its default value is "MBR". The spatial image sequence index (SequenceIndex) is a real value of approximation for a space that is the subject of the spatial image sequence, and the index value is given to the spatial image sequence according to the preset spatial image sequence index type (SequenceIndexType). At this time, the index value is in the form of a polygon.

Figure 5:
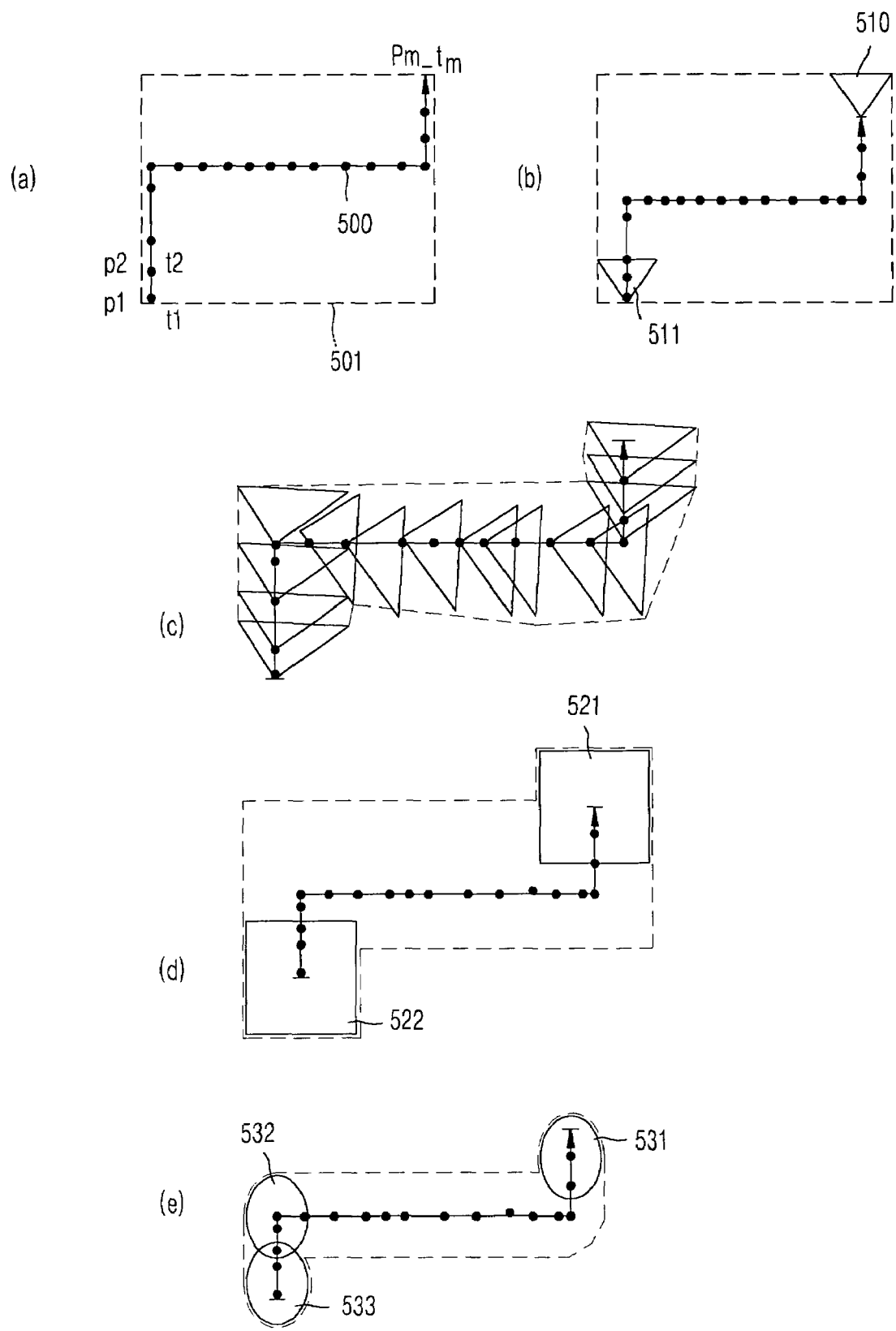
FIGS. 5A to 5E are views illustrating a method of constructing indexes of spatial image sequences according to the present invention.

Also, the MBR column, camera path (CameraPath) column, and camera time index (CameraTimeIndex) column are indexes for the spatial image as shown in FIG. 5A. The MBR column represents the minimum bounding rectangle for the camera moving area in the spatial image sequence, and the camera path (CameraPath) column is the trace of the camera moving path, which is a line string composed of p1, p2, . . . , pm of FIG. 5A. The camera time index (CameraTimeIndex) column represents a list of time values t1, t2, . . . , tm at points p1, . . . , pm on the camera moving path.

Referring to FIG. 5A, the moving path 500 of the camera is composed of individual position information composed of vertexes p1, p2, . . . , pm corresponding to respective acquisition times t1, t2, . . . , tm, and "501" represents the minimum bounding rectangle (MBR) for the camera moving area in the spatial image sequence.

FIG. 5B shows an example in that the sequence index type (SequenceIndexType) column is set to "MBR", and indicates the minimum bounding rectangle (dotted area) including a spatial area 510 acquired from the camera position at the acquisition start time to the camera position at the acquisition end time. In FIG. 5B, "511" denotes a spatial area acquired in the camera position at the acquisition start time.

FIG. 5C shows an example in that the sequence index type (SequenceIndexType) column is set to "CONVEXHULL_TRAIANGLE", and indicates an effective spatial area effected from a triangle spatial area acquired in the camera position at the acquisition start time to a triangle spatial area acquired in the camera position at the acquisition end time.

FIG. 5D shows an example in that the sequence index type (SequenceIndexType) column is set to "CONVEXHULL_MBR", and indicates an effective spatial area effected from an MBR spatial area 522 acquired in the camera position at the acquisition start time to an MBR spatial area 521 acquired in the camera position at the acquisition end time.

FIG. 5E shows an example in that the sequence index type (SequenceIndexType) column is set to "BUFFER", and indicates an effective spatial area effected from a circular spatial area 533 acquired in the camera position at the acquisition start time to a circular spatial area 531 acquired in the camera position at the acquisition end time.

Referring again to Table 1, the view area type (ViewAreaType) column and the view area (ViewArea) column are for the index of the spatial image view area as shown in FIGS. 6A to 6C. The view area type (ViewAreaType) defines a method of storing a spatial information area included in a spatial image. The view area type may be set to one among "MBR", "TRIANGLE", and "3DPYRAMID", and its default value is "MBR".

The view area index (ViewAreaIndex) is an index value of the spatial information area included in the spatial image, and for example, represents a list of view areas arranged in the order of t1, t2 and t3 in FIG. 6A.

FIG. 6A shows an example in that the view area type (ViewAreaType) is set to "3DPYRAMID", and illustrates a 3-dimensional (3D) pyramid type spatial image 610 acquired at an acquisition time t1 on the camera path, a 3D pyramid type spatial image 611 acquired at an acquisition time t2, and a 3D pyramid type spatial image 612 acquired at an acquisition time t3. FIG. 6B shows an example in that the view area type (ViewAreaType) is set to "TRIANGLE", and illustrates triangle spatial images 621 acquired at respective times effecting from the acquisition start time to the acquisition end time on the camera path. FIG. 6C shows an example in that the view area type (ViewAreaType) is set to "MRB", and illustrates MRB spatial images 631 acquired at respective times effecting from the acquisition start time to the acquisition end time on the camera path.

FIG. 4C shows the schema of the spatial image sequence (GeoImageSequence) table. The spatial image sequence table is a table for storing spatial image sequence data.

Referring to FIG. 4C, the spatial image sequence (GeoImageSequence) table is composed of a spatial image identifier (GeoImageID) column that is an identifier of the spatial image, an acquisition time, i.e., a creation time (CreationTime) column for indicating the acquisition time of the spatial image, a view area (ViewArea) column for the spatial area included in the spatial image, x, y, z, roll, pitch and yo columns for storing camera exterior orientation during the spatial image acquisition, a reference spatial image (refGeoImage) column for storing a real file name of the spatial image or a reference relative time of a spatial image video, an MBR column for storing rectangle coordinates included in the spatial image, and a row data (rowData) column for storing the spatial image in the form of a real still image.

Here, as described above, if the camera type (CameraType) column is "video", the reference spatial image (refGeoImage) becomes the relative time of the spatial image video. If the data source column is "in row (InRow)" in case that the camera type (CameraType) column is "snapshot", the reference spatial image (refGeoImage) becomes "Null", and the real data is stored in a row data (rowData) column of the same table. In case that the real data is stored in the file system, the value of the reference spatial image (refGeoImage) column becomes the name of the still spatial image existing in the directory, and the row data (rowData) column becomes "Null".

FIG. 4D shows the schema of the spatial image object table corresponding to the sequence designated as the spatial image sequence identifier (GeoImageSequenceID), and FIG. 4E shows the schema of the spatial object table defined as a spatial object type name (ObjectTypeName).

The spatial image object (GeoImage-Objects) table of FIG. 4D is composed of a spatial object identifier (GeoObjectID) column that is an identifier of the spatial object existing in the spatial image, a spatial image identifier (GeoImageID) column that is an identifier of the spatial image in which the spatial object exists, an object type (ObjectType) column that is a type of the spatial object, an MBR column that is a rectangle area in which the spatial object exists, and an object shape (ObjectShape) column for expressing a real shape of the spatial object.

The spatial objects object type (GeoObjects-ObjectType) table of FIG. 4E is composed of a spatial object identifier (GeoObjectID) column that is an identifier of the spatial object, an object type (ObjectType) column that is a type of the spatial object, an object name (ObjectName) column for storing the name of the spatial object, and a plurality of object attributes (ObjectAttributes) column for expressing the characteristics of the respective objects.

Figure 7:
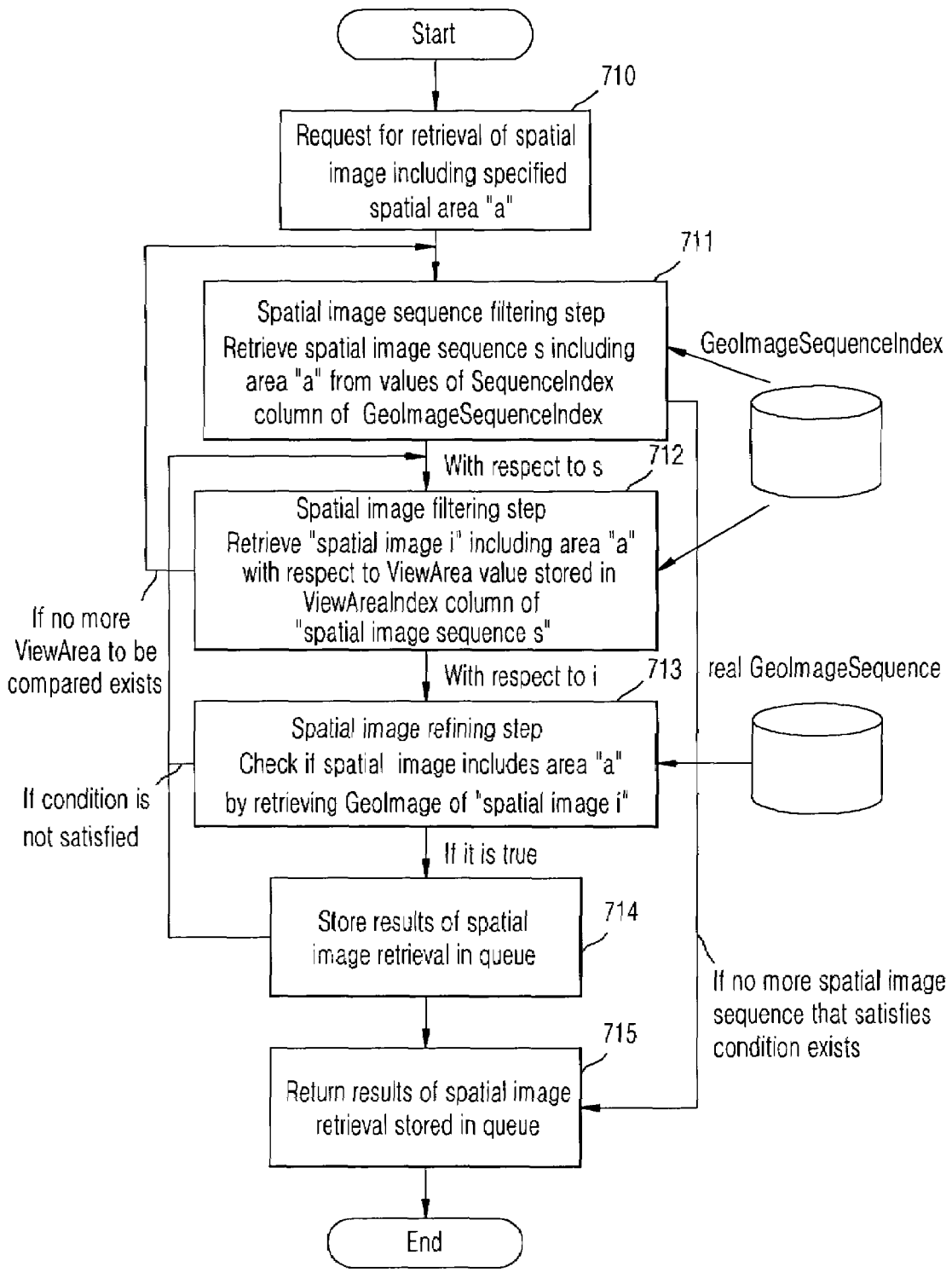
FIG. 7 is a flowchart illustrating a procedure of performing retrieval of spatial images in the spatial image information system according to the present invention.

FIG. 7 is a flowchart illustrating a procedure of performing retrieval of spatial image information according to the embodiment of the present invention. Referring to FIG. 7, if an interface call for retrieving a spatial image including a designated spatial area "a" is requested from an external client (step 710), the spatial image information system 100 according to the present invention retrieves a "spatial image sequence s" including an area "a" from values of the sequence index (SequenceIndex) column of the spatial image sequence index (GeoImageSequenceIndex) table at a spatial image sequence filtering step (step 711).

Then, the system retrieves a "spatial image i" including the area "a" using the view area (ViewArea) value stored in the view area index (ViewAreaIndex) column with respect to the "spatial image sequence s" retrieved at a spatial image filtering step (step 712), and checks if a real spatial image includes the "a" area by loading the "spatial image i" from the spatial image sequence (GeoImageSequence) tables including the "spatial image i" retrieved at a spatial image refining step (step 713). If no more view area to be compared exists at the spatial image filtering step (step 712), the system retrieves another spatial image sequence including the area "a" by repeating the spatial image sequence filtering step (step 711).

If the real spatial image includes the area "a" as a result of checking the spatial image i (i.e., if it is true), the system stores results of the spatial image retrieval in a queue (step 714), and then retrieves another spatial image including the area "a" by repeating the spatial image filtering step (step 712). Meanwhile, even if the real spatial image does not include the area "a" as a result of checking the spatial image i (i.e., if the condition is not satisfied), the system still retrieves another spatial image including the area "a" by repeating the spatial image filtering step (step 712).

If the "a" area retrieval is completed with respect to all the spatial image sequences by repeating the above-described steps, the system returns the results of retrieval stored in the queue, and then terminates the retrieval (step 715).

Meanwhile, if an interface call for retrieving a designated spatial area "a" in a specified spatial image sequence s is requested from the external client, the system omits the spatial image sequence filtering step (step 711), and performs the spatial image filtering step (step 712) and the spatial image refining step (step 713). Accordingly, in case of retrieving the designated spatial image sequence, the retrieval can be processed more rapidly.

As described above, the spatial image information system according to the present invention has the advantages that it can support an efficient storage and rapid retrieval of spatial images using index tables, and improves mutual operation of spatial image applications with a simplified development procedure by separating from a spatial image application client of the spatial image information system and exclusively charging the spatial image data management and retrieval function.

Also, in systems in which the spatial image and the numerical map are associated with each other, the system according to the present invention can provide an extension in storing spatial image information by using open type database access interface components for simply storing moving images and still images in a file system and storing associated data in a database.

While the database for efficient association of a moving image, still image and numerical map and a management method for the associated information according to the present invention has been described and illustrated herein with reference to the preferred embodiment thereof, it will be understood by those skilled in the art that various changes and modifications may be made to the invention without departing from the spirit and scope of the invention, which is defined in the appended claims.

What is claimed is:

1. A spatial image information system for efficient storage and retrieval of spatial images acquired by an image acquisition device provided with a navigation system, the system comprising:

a spatial image query interface component section for performing an interface function for interfacing with an external client, and processing a spatial image database construction query, spatial image retrieval/insertion/deletion queries, and a spatial object information manipulation query in the spatial images;

a spatial image meta information component section for managing schema and index information of spatial image sequences, and processing a query about index information if the query about the index information is inputted from the spatial image query interface component section;

a spatial image storage/retrieval component section for processing storage, retrieval and management of the spatial image sequences according to the query of the spatial image query interface component section;

a spatial image to real coordinate conversion component section for receiving and converting the spatial image and a specified position in the image into a real-world coordinate (x,y,z) or receiving and converting the real-world coordinate (x,y,z) and the spatial image into the specified position in the spatial image according to the query of the spatial image query interface component section; and an open type spatial image database interface component section for storing and managing the spatial images by interfacing the spatial image meta information component section, the spatial image storage/retrieval component section and the spatial image to real coordinate conversion component section with a storage system irrespective of a kind of the storage system.

2. The system of claim 1, wherein a database structure of the spatial image information system comprises:

spatial image sequence tables for storing the spatial images and information;

spatial image object tables for storing information on spatial objects existing in spatial image sequences;

a spatial image sequence information table including schema information and indexes of the spatial image sequences and summary information; and a spatial image sequence index table for managing indexes so as to promptly retrieve the spatial image sequence tables.

3. The system of claim 2, wherein the spatial image sequence information table comprises a camera type (CameraType) column for indicating whether the image acquisition device is a general camera for acquiring snapshot images or a video type sequential spatial image acquisition camera, a camera number (NumOfCameras) column for indicating the number of cameras used for the image acquisition in the image acquisition device, and an interior orientation (InteriorOrientation) column for storing an interior orientation of a camera lens.

4. The system of claim 2, wherein the spatial image sequence index table comprises an acquisition start time (fromTime) column for storing the smallest image acquisition time value in the corresponding spatial image sequence, and an acquisition end time (toTime) column for storing the largest image acquisition time value in order to enable an efficient retrieval of a spatial image sequence lifetime.

5. The system of claim 2, wherein the spatial image sequence index table comprises a minimum bounding rectangle (MBR) column for an MBR of a moving path of a camera, a camera path (CameraPath) column for heightening a query speed with respect to the moving trace path of the camera by storing the moving trace path of the camera in the form of a line string (LineString) in order to reduce a fault area if filtering is performed using the MBR during the spatial image retrieval by the moving path trace of the camera, and a camera time index (CameraTimeIndex) column for storing time values at vertexes constituting the respective camera path in order to enable an efficient retrieval of position information of the spatial image acquisition camera without retrieving the spatial image sequence table.

6. The system of claim 2, wherein the spatial image sequence index table has a sequence index type (SequenceIndexType) column so as to apply diverse kinds of filtering types to a sequence index for efficiently retrieving of what area the spatial image sequence in the spatial image information system includes spatial information.

7. The system of claim 6, wherein the spatial image sequence index table stores a spatial information area included in the spatial image sequence in the form of an MBR in the spatial image sequence index table so as to efficiently perform a view spatial area of the spatial image sequence.

8. The system of claim 6, wherein the spatial image sequence index table stores a spatial information area included in the spatial image sequence in the form of a convex hull so as to efficiently perform a view spatial area of the spatial image sequence.

9. The system of claim 6, wherein the spatial image sequence index table stores a spatial information area included in the spatial image sequence in the form of a buffered value with respect to a moving trace of a camera so as to efficiently perform a view spatial area of the spatial image sequence.

10. The system of claim 2, wherein the spatial image sequence index table comprises a view area type (ViewAreaType) column for writing a type of a view area (ViewArea) of a spatial image in the spatial image information system, and a view area index (ViewAreaIndex) column for storing a list of view area (ViewArea) values of a real spatial image sequence, so that the retrieval is performed irrespective of the type of the view area (ViewArea).

11. The system of claim 10, wherein the spatial image sequence index table simplifies and stores the view area (ViewArea) of the respective spatial image in the spatial image sequence in the form of a 2-dimensional MBR area.

12. The system of claim 10, wherein the spatial image sequence index table simplifies and stores the view area (ViewArea) of the respective spatial image in the spatial image sequence in the form of a 2-dimensional triangle area.

13. The system of claim 10, wherein the spatial image sequence index table simplifies and stores the view area (ViewArea) of the respective spatial image in the spatial image sequence in the form of a 3-dimensional pyramid with a camera mounted thereon.

14. A method for retrieving spatial images including a designated area in a spatial image information system for storing the spatial images acquired by an image acquisition device provided with a navigation system using a database structure composed of spatial image sequence tables for storing the spatial images and information, spatial image object tables for storing information on spatial objects existing in spatial image sequences, a spatial image sequence information table including schema information and indexes of the spatial image sequences and summary information, and a spatial image sequence index table for managing indexes so as to promptly retrieve the spatial image sequence tables, the method comprising:

- a spatial image sequence filtering step of retrieving the spatial image sequences including the designated area using the spatial image sequence indexes of the spatial image sequence index table;
- a spatial image filtering step of retrieving the spatial images including the designated area with respect to the spatial image sequences retrieved at the spatial image sequence filtering step; and
- a spatial image refining step of checking whether a real spatial image includes the designated area by loading the spatial images, which are retrieved at the spatial image filtering step, from the spatial image sequence tables.

15. The method of claim 14, further comprising:

if a retrieval range is limited to a retrieval of a specified spatial image sequence when the retrieval is requested,
- a spatial image filtering step of retrieving the spatial images including the designated area with respect to the specified spatial image sequence; and
- a spatial image refining step of checking whether a real spatial image includes the designated area by loading the spatial images, which are retrieved at the spatial image filtering step, from the specified spatial image sequence table.

* * * * *